US012811769B2

(12) United States Patent
Pillilli et al.

(10) Patent No.: US 12,811,769 B2
(45) Date of Patent: Nov. 24, 2026

(54) DETECTING AND MITIGATING SIDE CHANNEL ATTACKS WITH RAZOR-FLOPS

(71) Applicant: MICROSOFT TECHNOLOGY LICENSING, LLC, Redmond, WA (US)

(72) Inventors: Bharat S. Pillilli, Sacramento, CA (US); Bryan David Kelly, Carnation, WA (US); Vishal Soni, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 195 days.

(21) Appl. No.: 17/973,471

(22) Filed: Oct. 25, 2022

(65) Prior Publication Data

US 2024/0137203 A1 Apr. 25, 2024
US 2024/0235806 A9 Jul. 11, 2024

(51) Int. Cl.
*G06F 21/72* (2013.01)
*H04L 9/00* (2022.01)
*H04L 9/08* (2006.01)

(52) U.S. Cl.
CPC .............. *H04L 9/002* (2013.01); *G06F 21/72* (2013.01); *H04L 9/0894* (2013.01)

(58) Field of Classification Search
CPC ... H04L 9/002; H04L 9/0894; H04L 2209/12; H04L 9/003; G01R 31/3181
See application file for complete search history.

(56) References Cited

U.S. PATENT DOCUMENTS 7,590,880 B1 * 9/2009 Hershman .............. G06F 21/755 713/400
8,359,479 B2 * 1/2013 Grinchuk .............. H04L 9/0662 708/7

(Continued)

OTHER PUBLICATIONS

S. Das et al., "A self-tuning DVS processor using delay-error detection and correction," in IEEE Journal of Solid-State Circuits, vol. 41, No. 4, pp. 792-804, Apr. 2006, doi: 10.1109/JSSC.2006.870912. (Year: 2006).*

(Continued)

*Primary Examiner* — Jorge L Ortiz Criado
*Assistant Examiner* — Miguel Alexander Lopez
(74) *Attorney, Agent, or Firm* — Scott Y. Shigeta; Newport IP, LLC

(57) ABSTRACT

The techniques disclosed herein are directed to devices, circuits, systems, and techniques to mitigate the impact of side-channel attacks on a cryptography function in a target system. The Razor flip-flops are inserted into critical paths of the cryptography function of the target system, including at rest blocks such as key vaults and data vaults, and also including registers and/or pipelines used for calculations within the cryptography functions. Errors detected by the Razor flip-flops are processed by error detection logic in the cryptographic function, which continues the calculations until completion. The generated key and data value pairs resulting from detected errors are discarded, silently ignored without disrupting the calculation process. The schemes disclosed herein mitigate the impact of side-channel attacks with a digital logic based implementation, with reduced complexity and reduced cost.

14 Claims, 7 Drawing Sheets

(56) References Cited

U.S. PATENT DOCUMENTS

| | | | | |
|---|---|---|---|---|
| 8,595,513 | B2 * | 11/2013 | Adjedj | H04L 9/008 713/193 |
| 8,625,780 | B2 * | 1/2014 | Peter | G06F 7/00 713/189 |
| 8,977,902 | B2 * | 3/2015 | Condorelli | G06F 21/556 714/27 |
| 9,577,821 | B2 * | 2/2017 | Kim | H04L 9/002 |
| 9,780,949 | B2 * | 10/2017 | Glickman | H04L 9/10 |
| 9,992,013 | B2 * | 6/2018 | Georgieva | H04L 9/3026 |
| 10,164,770 | B1 * | 12/2018 | Lee | G06F 8/445 |
| 10,389,522 | B2 * | 8/2019 | Riou | G06F 21/72 |
| 10,608,643 | B2 * | 3/2020 | Shinohara | H01L 22/14 |
| 11,792,004 | B2 * | 10/2023 | Ghosh | G06F 7/53 713/158 |
| 12,039,057 | B2 * | 7/2024 | Kushtagi | G06F 21/602 |
| 12,333,056 | B2 * | 6/2025 | Loubet Moundi | G06F 21/755 |
| 2007/0162798 | A1 * | 7/2007 | Das | G06F 11/0721 714/724 |
| 2009/0249175 | A1 * | 10/2009 | Chandra | G06F 11/00 714/822 |
| 2015/0326210 | A1 * | 11/2015 | Beerel | H03K 19/00323 326/94 |
| 2016/0140340 | A1 * | 5/2016 | Walters | G06F 21/556 726/22 |
| 2016/0154905 | A1 * | 6/2016 | Beerel | H03K 3/037 716/104 |
| 2017/0083040 | A1 * | 3/2017 | Zhang | H04L 9/005 |
| 2017/0244546 | A1 * | 8/2017 | Stark | G06F 7/582 |
| 2017/0288855 | A1 * | 10/2017 | Kumar | H04L 9/003 |
| 2019/0097818 | A1 * | 3/2019 | Lu | H04L 9/3263 |
| 2019/0318130 | A1 * | 10/2019 | Ghosh | H04L 9/003 |
| 2020/0012783 | A1 * | 1/2020 | Vineyard | G06F 21/566 |
| 2020/0012822 | A1 * | 1/2020 | Vineyard | G06F 21/567 |
| 2021/0026994 | A1 * | 1/2021 | Tehranipoor | G06F 30/343 |
| 2021/0312045 | A1 * | 10/2021 | Bolotov | G06F 21/602 |
| 2024/0012950 | A1 * | 1/2024 | Kang | G06F 21/64 |

OTHER PUBLICATIONS

S. Ryu, J. Koo, W. Kim, Y. Kim and J.-J. Kim, "Variation-Tolerant Elastic Clock Scheme for Low-Voltage Operations," in IEEE Journal of Solid-State Circuits, vol. 56, No. 7, pp. 2245-2255, Jul. 2021, doi: 10.1109/JSSC.2020.3048881. (Year: 2021).*

F. Worm, P. Thiran and P. Ienne, "Designing robust checkers in the presence of massive timing errors," 12th IEEE International On-Line Testing Symposium (IOLTS'06), Lake Como, Italy, 2006, doi: 10.1109/IOLTS.2006.22 (Year: 2006).*

K. Sakiyama, T. Fujii, K. Matsuda and N. Miura, "Flush Code Eraser: Fast Attack Response Invalidating Cryptographic Sensitive Data," in IEEE Embedded Systems Letters, vol. 12, No. 2, pp. 37-40, Jun. 2020, doi: 10.1109/LES.2019.2949788. (Year: 2020).*

Ernst, et al., "Razor: A Low-Power Pipeline Based on Circuit-Level Timing Speculation", In Proceedings of 36th Annual International Symposium on Microarchitecture, Dec. 2003, 12 Pages.

Das, et al., "A Self-Tuning DVS Processor using Delay-Error Detection and Correction", IEEE Journal of Solid-State Circuits, vol. 41, No. 4, Apr. 1, 2006, pp. 792-804.

International Search Report and Written Opinion received for PCT Application No. PCT/US2023/031938, mailed on Dec. 8, 2023, 16 Pages.

Ryu, et al., "Variation-Tolerant Elastic Clock Scheme for Low-Voltage Operations", IEEE Journal of Solid-State Circuits, IEEE, USA, vol. 56, No. 7, Jan. 20, 2021, pp. 2245-2255.

International preliminary report on patentability received for PCT Application No. PCT/US23/031938, mailed on May 8, 2025, 9 Pages.

* cited by examiner

DETECTING AND MITIGATING SIDE CHANNEL ATTACKS WITH RAZOR-FLOPS

BACKGROUND

A side-channel attack (SCA) is a security exploit that attempts to gather information from a system by measuring or exploiting indirect effects on the system hardware. Instead of targeting software code directly, sensitive information such as cryptographic keys, passwords, security bits and other information may be identified by measuring coincidental variations in hardware performance. A SCA may sometimes be referred to as a sidebar attack or an implementation attack.

There are a number of different classes of SCAs, including but not limited to the following: cache attack, timing attack, power monitoring attack, electromagnetic monitoring attack, acoustic monitoring attack, differential fault analysis, data remanence, software-initiated fault attacks, and optical attacks. In all of these types of SCAs, there is an underlying principle that the evaluation of the physical effects caused by a hardware system can provide useful information about the secret characteristics of the system itself. For example, in a cryptography based security system, a cryptography method and security key can be determined by careful analysis of the physical characteristics observed along the side of the security system, and thus without a direct system interaction.

SCAs are now becoming more common because of many factors. In one example, a SCA can be enabled by high sensitivity measurement equipment, which now make it possible to gather extremely detailed measurements about a hardware systems operation. In another example, machine learning algorithms can be leveraged to analyze very large data sets and identify security information. Through a combination of high sensitivity measurements and machine learning, attackers may now exploit subtle changes in a hardware systems operation and exploit these variations to break the security.

The present disclosure contemplates a countermeasure to a side-channel attack that mitigates the impact of the side-channel attacks by use of razor flip-flops. The disclosed solutions can be implemented at a reduced complexity when compared to conventional analog countermeasure solutions, which require specific knowledge of the critical paths. Additionally, the razor flip-flop implementations disclosed herein are digital components that may be implemented with a lower overall cost of implementation. The disclosure made herein is presented with respect to these and other technical challenges.

SUMMARY

The techniques disclosed herein are directed to devices, circuits, systems, and techniques to mitigate the impact of side-channel attacks on a cryptography function in a target system. The Razor flip-flops are inserted into critical paths of the cryptography function of the target system, including at rest blocks such as key vaults and data vaults, and also including registers and/or pipelines used for calculations within the cryptography functions. Errors detected by the Razor flip-flops are processed by error detection logic in the cryptographic function, which continues the calculations until completion. The generated key and data value pairs resulting from detected errors are discarded, silently ignored without disrupting the calculation process. The schemes disclosed herein mitigate the impact of side-channel attacks with a digital logic based implementation, with reduced complexity and reduced cost.

Some described embodiments may be implemented as devices, circuits, and systems, which may include software. An example implementation may include a key vault, a data vault and cryptographic function; where: the key vault has a first input port, a key output port, a first power port, and a first clock port; the data vault has a second input port, a data output port, a second power port, and a second clock port; and the cryptography function has a key input port, a data input port, a cryptographic key output port, a cryptographic output port, a third power port, and a third clock port. A first razor-flop may be located within the key vault and positioned between the key output port and the key input port. A second razor-flop may be located within the data vault and positioned between the data output port and the data input port. A third razor-flop that is located within a calculation path of the cryptography function. An error detection logic in the cryptography function senses errors associated with the side channel-attack from any one of the first, second, and third razor flip-flops, wherein the error detection logic indicates that an output of the cryptography function is to be encoded as invalid.

This Summary is provided to introduce a selection of concepts in a simplified form that are further described below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. References made to individual items of a plurality of items can use a reference number with a letter of a sequence of letters to refer to each individual item. Generic references to the items may use the specific reference number without the sequence of letters.

DETAILED DESCRIPTION

In the following detailed description, reference is made to the accompanied drawings, which form a part hereof, and which is shown by way of illustration, specific example configurations of which the concepts can be practiced. These configurations are described in sufficient detail to enable those skilled in the art to practice the techniques disclosed herein, and it is to be understood that other configurations can be utilized, and other changes may be made, without departing from the spirit or scope of the presented concepts. The following detailed description is, therefore, not to be taken in a limiting sense, and the scope of the presented concepts is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means a direct electrical connection between the items connected, or an indirect connection through one or more passive or active intermediary devices and/or components. The terms "circuit" and "component" means either a single component or a multiplicity of components, either active and/or passive, that are coupled to provide a desired function. The term "signal" means at least a power, current, voltage, or data signal. Based upon context, the term "coupled" may refer to a wave or field coupling effect, which may relate to a corresponding magnetic field, electrical field, or a combined electromagnetic field.

Side-channel attacks (SCAs) are typically aimed at extracting secrets from a chip, circuit, or system, through measurement and analysis of a variety of physical parameters. Examples of such parameters may include measurements for any one of power supply currents or voltages, execution time or clock intervals, and various other parameters such as electromagnetic, optical, or thermal emissions. These side-channel attacks pose a significant threat to components and modules in cryptographic systems.

Figure 1:
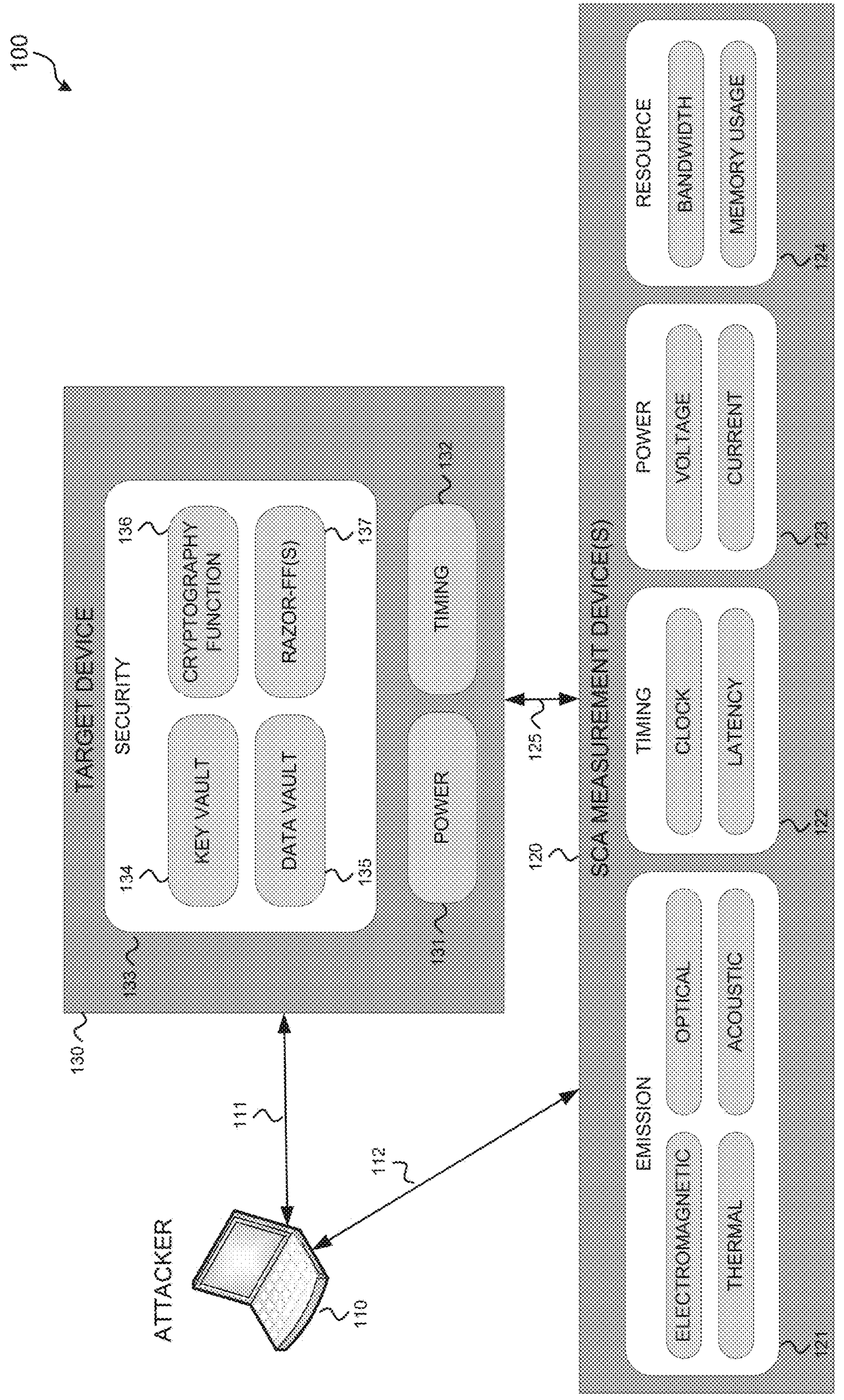
FIG. 1 shows an illustrative schematic of an attacker attempting to breach security with a side channel attack on a target device that is arranged in accordance with aspects of the present disclosure.

FIG. 1 shows an illustrative schematic 100 of an attacker attempting to breach security with a side channel attack on a target device that is arranged in accordance with aspects of the present disclosure. As shown, an attacker 110 may attempt a side channel attack on a target device 130 by employing one or more SCA measurement devices 120.

In one example, an attacker 110 attempt to gain access to the target device 130 by a communication link 111. Before the communication link 111 is established, the attacker 110 activates one or more of the SCA measurement devices 120 to monitor the physical operation of the target device 130. As the access to the target device is attempted (e.g., a password login attempt), the physical parameters of the target device 130 are captured. The capture of these physical parameters can correspond to any variety of measurement, including but not limited to capture of variations in emissions 121, timing 122, power 123 or resource usage 124.

Example emissions 121 that may be observed include electromagnetic radiation observed via an oscilloscope or an RF analyzer, thermal heat patterns observed via a thermal imager, optical changes in an LED such as may be observed during disk access on a hard disk or SSD drive, or capture of acoustic sounds that are observed with a microphone listening to the operation of the target device. Cryptosystems emit when they perform operations, and these emissions may be correlated with a security operation on a target device. Cryptanalysis may thus involve monitoring and capturing these emissions, identifying emission patterns, and deducing information about the cryptosystem on the target device. In some instances, the attacker 110 may be able to obtain secret keys and compromise the system security by this type of analytical approach.

Example timing 122 variations that may be observed include changes in clock timing (e.g., changes in the number of clock pulses over a time interval, changes in the clock frequency, changes in clock pulse width or duty cycle, etc.) or changes in overall latency between operations. Computer operations take time to execute, and the amount of time required for execution may vary based on the input. The differences in timing can be caused by processor instructions that vary in timing based on branching and conditional statements, RAM cache hits or misses, complex vs simple calculation, and many other reasons. In some instances, the attacker 110 may be able to analyze these timing changes and deduce secret keys to compromise the system security.

Example power 123 variations that may be observed includes changes in peak or average voltage or current consumption. Power monitoring side-channel attacks requires the attacker to have access to the power consumption of the target device. The attacker monitors the power consumption of the target device or cryptographic system while it performs various operations, and then performs power analysis to deduce patterns in operation. There are two different types of power analysis: simple and differential. Simple power analysis can be performed by carefully evaluating spikes in current or voltage changes over time and to deduce secret keys or secret data. Differential power analysis attempts to correlate specific power consumption via statistical functions that are customized towards the specific cryptography algorithm, while also employing error correction and signal processing techniques that are more immune to noise.

Example resource 124 variations that may be overserved includes memory usage, disk usage, cache usage and bandwidth usage. These resource allocation-based side-channel attacks differ in that the attacker monitors the number of resources that have been allocated to a process on the target device. The attacker can then attempt to then use this allocation-based information in an attempt to break the system security of the target device.

The presently disclosed target device 130 may include power control 131, timing control 132, and a security system 133. The power control 131 and the timing control 132 may be vulnerable to side channel attacks. However, the security system 133 of the target device 130 may be implemented with a key vault 134, a data vault 135, a cryptography function 136 and a number of Razor flip-flops 137, which are specifically configured to mitigate side channel attacks. The configuration and use of the Razor flip-flops 137 will be described further below.

Side Channel Attacks (SCAs) come in various flavors which may include power glitch attacks (e.g., voltage or current glitching) and timing glitch attacks (e.g., clock glitching). Power and timing glitch attacks can be used change the execution sequence of the logic in the target device. Examples of such attacks include, but are not limited to, a change in program execution path of a computational engine, differential power analysis (DPA) of cryptography circuitry, changing the outcome of cryptography to be semi-random, etc.

Glitch attacks are a type of fault injection attack (FIA), which is an active attack that is intended to physically disrupt and stress the target device beyond its intended operating conditions. A fault injection attack is not intended to permanently impair the target device, but is instead intended to create a transient fault with temporary errors in the target device. The target device will exhibit abnormal operation under the attack, disrupting the program control flow or corrupting the results of an operation in an attempt to gain unauthorized access to secret codes or data. Some fault injection attacks may be invasive, requiring significant modification of the target device, while others may be substantially non-invasive, requiring little or no tampering with the target device.

Power and timing based glitch attacks are considered substantially non-invasive, requiring little or no modification of the target device to initiate the attack. In a power glitch, power supplied to the target device (e.g., power and/or ground pins) is adjusted beyond the intended operating limits (e.g., a voltage or current glitch or spike is injected). In a clock glitch, the clock signal supplied to the target device (e.g., a reference clock pin or an oscillator or multiplier input) is adjusted to increase or decrease the target devices operation and attempt to disrupt synchronization between internal components of the target device.

Additional types of non-invasive fault attacks are also contemplated, including but not limited to thermal or heating attacks and electromagnetic attacks. In a thermal attack, the target device is exposed to temperatures beyond its maximum or minimum operational guidelines to generate errors in operation. In an electromagnetic attack a strong electromagnetic pulse is emitted to expose the target device in an attempt to cause a fault in operation.

In order to address these attacks, many countermeasures may be used such as: establishing a uniform instruction timing for all calculations, applying noise injectors in the target system, masking, adding environment protection circuitry such as adding shielding from the detection of RF, optical, or acoustic signals, etc. However, data at rest such as "secret keys", which flow through the flip-flops from key vaults to cryptography blocks, may still be susceptible to side-channel attacks.

Figure 2:
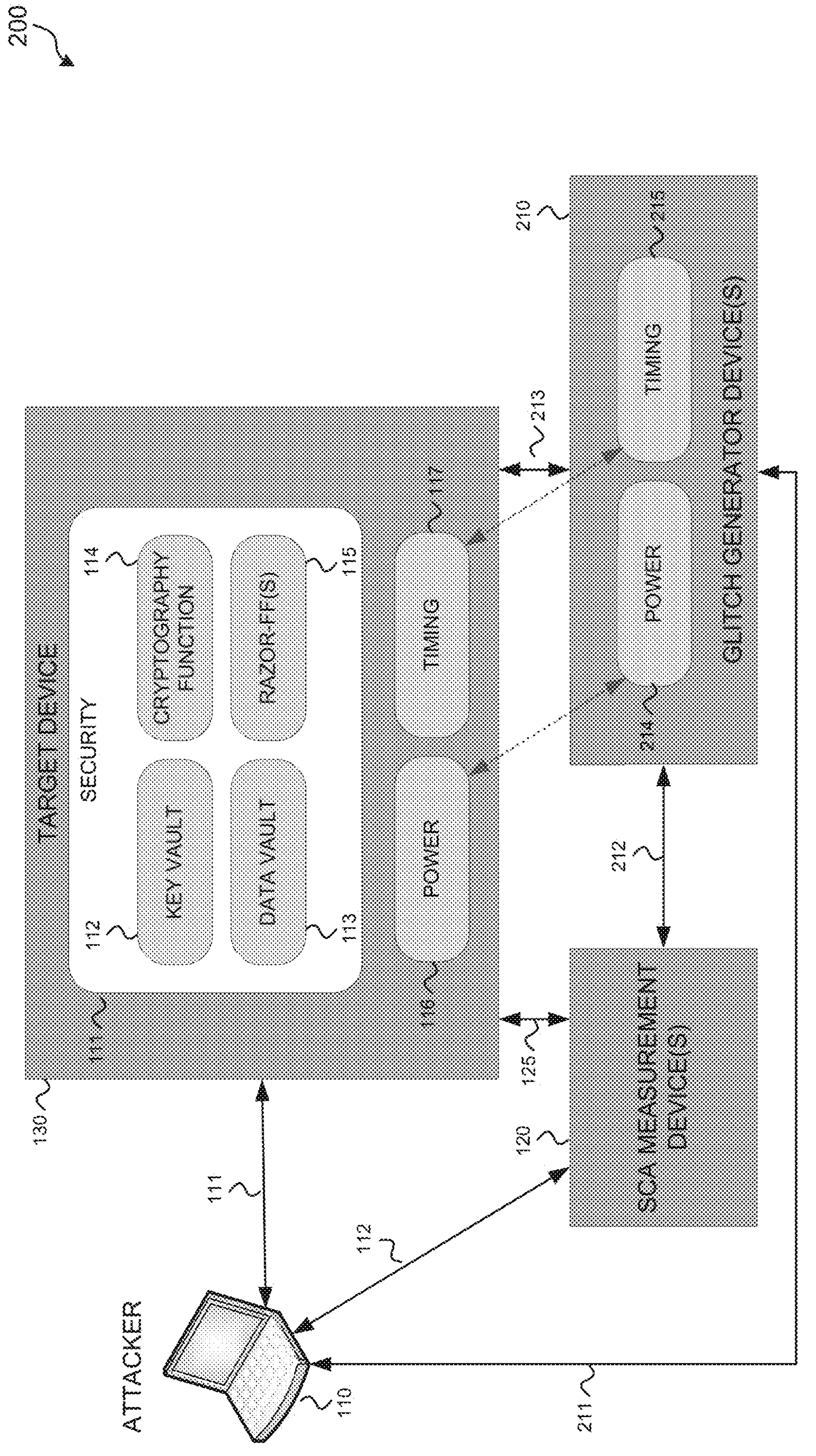
FIG. 2 shows an illustrative schematic of an attacker attempting to breach security with a glitching type of side channel attack on a target device that is arranged in accordance with aspects of the present disclosure.

FIG. 2 shows an illustrative schematic 200 of an attacker attempting to breach security with a glitching type of side channel attack on a target device that is arranged in accordance with aspects of the present disclosure. As shown, an attacker 110 may attempt a side channel attack on a target device 130 by employing one or more SCA measurement devices 120, and one or more glitch generator devices 210.

The basic configuration of FIG. 2 is substantially similar to that shown in FIG. 1, with the addition of the glitch generator device(s) 210. The glitch generator device(s) is under the control 211 of the attacker 110, who also controls 112 the side channel attack measurement device(s) 120. The SCA measurement device 120 can be configured to monitor 125 operation of the target device 125 and gather measurement data to be relayed to the attacker 110. The SCA measurement device 120 can optionally control and/or capture information 212 from the glitch generator device(s), which are configured to modify the power and/or timing of the target device 130 by injecting glitches 213 into the target device 130.

The presently disclosed solution provides an approach that applies Razor flip-flops to replace conventional flip-flops in specific locations in security specific logic such as crypto engines, data vaults and key vaults to, where the Razor flip-flops are configured to detect the power & timing glitch attacks in side-channel attack, and safely secure the design from leaking information that may otherwise compromise the target system.

The concept of a Razor flip-flop was introduced in an effort to detect deviations in critical timing paths that are influenced by the clock duty cycle and voltage variations in a circuit. The Razor flip-flop includes an error output signal that indicates when the critical timing paths are impacted, which can then be used to make logical corrections and architectural changes. Although the Razor flip-flop itself has conceptually existed for some time, the concepts envisioned have not been realized. One possible explanation for lack of adoption, and lack of success of others, is that the Razor flip-flop introduces increased complexity in the system design, which may require design automation tools that have yet to be implemented. Additionally, the design automation would need to find the appropriate critical paths to introduce Razor flip-flops. Another possible explanation for lack of adoption and success of others is that the area consumed by a Razor flip-flop is relatively large and thus increases the overall complexity of design and cost of manufacturing. Another possibility for lack of adoption is the power consumption of a Razor flip-flop is much higher than a conventional flip-flop.

The present disclosure proposes a novel SCA detection approach against power and timing based glitch attacks by using Razor flip-flops along a critical path of a secured system. The secured system or target device that employs the disclosed techniques may be implemented as many different product types, including but not limited to a system on a chip (SOC), an application specific integrated circuit (ASIC), a field programmable gate array (FPGA), a graphics processor unit (GPU), or a general processor or microcontroller such as a central processing unit (CPU), to name a few.

Conceptually, from one flip-flop to the next flop-flop's transistor behavior point of view, a power or timing glitch can essentially cause an incorrect value to be latched either by: applying a higher or lower voltage on a transistor and thereby making the transistor operate faster or slower; or changing the timing guard bands (e.g., rated clock frequency and/or duty cycle) enough for the input flip-flop to violate the set up or hold times. The present disclosure contemplates that by positioning a Razor flip-flop in a critical timing path, errors in the critical timing path caused by glitch attacks can be detected and protect against leaking of security keys at rest and leaking of security keys at calculation.

Conventionally, keys at rest are security keys that are sitting in a key vault, which are conventionally implemented as register flip-flops or static random access memory (SRAM). In the present disclosure, a Razor flip-flop is introduced into the design of the key vault.

Keys under calculation are security keys that are generated during the operation of the cryptography function. For example, an elliptic-curve cryptography (ECC) key is generated by taking in a seed and a value to generate a public, private key pair. The mathematical calculations required to generate the public, private key pair are presumptively done through register based flip-flops, fed back in iterations, and finally reaching an outcome as defined by an ECC polynomial. In the present disclosure, a Razor flip-flop is introduced into the design of the key calculation path.

The design of the Razor flip-flop protected system or device will become more apparent from additional examples described below.

Figure 3:
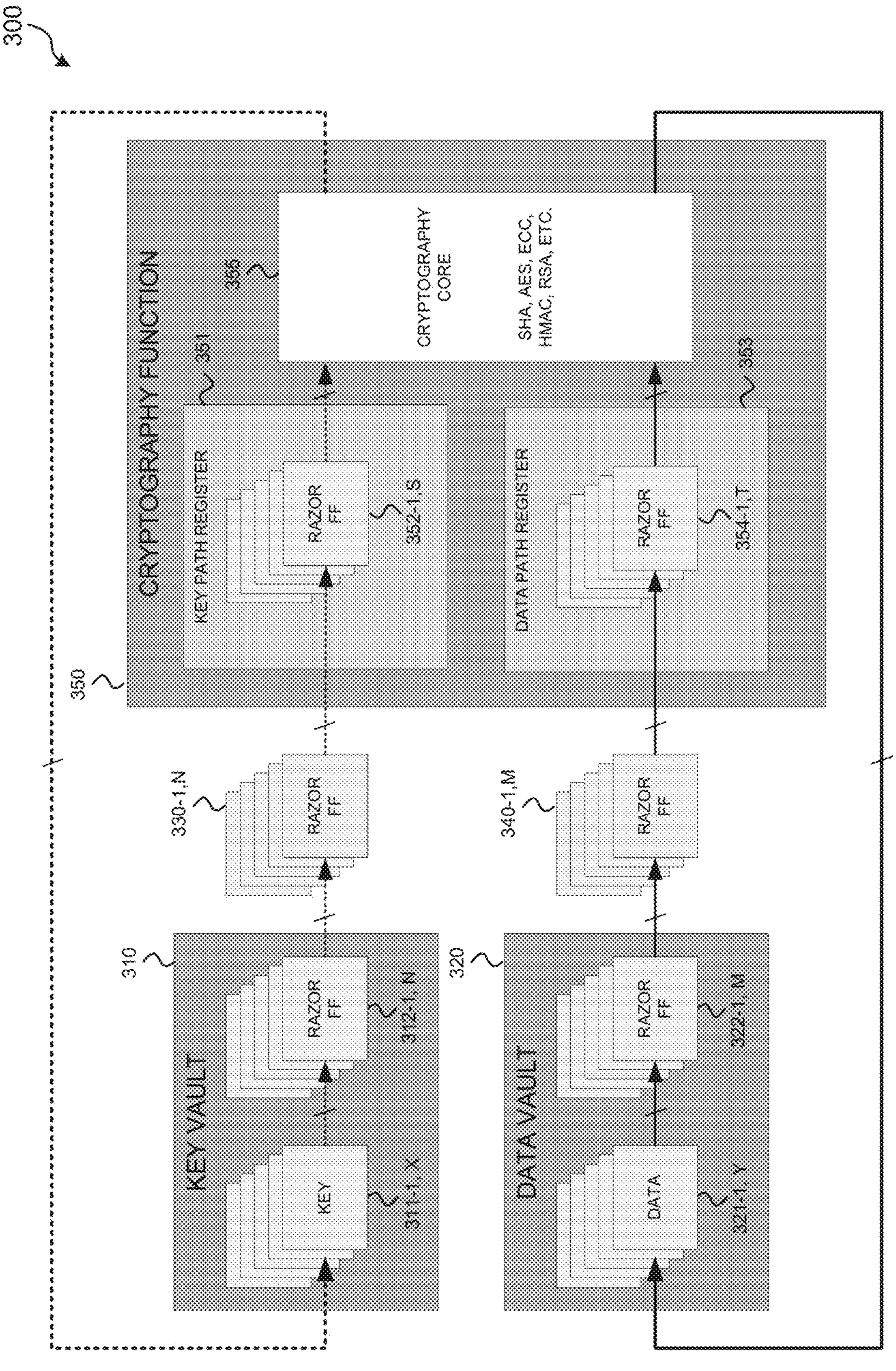
FIG. 3 shows an illustrative schematic of a first example device that is arranged in accordance with aspects of the present disclosure.

FIG. 3 shows an illustrative schematic of a first example device 300 that is arranged in accordance with aspects of the present disclosure. Device 300 includes a key vault 310, a data vault 320, and a cryptography function 350. Device 300 also includes optional Razor flip-flops 330-1, N; and 340-1, N.

Key vault 310 includes a number (X) of keys 311-1 through 311-X and a number (N) of Razor flip-flops 312-1 through 312-N. The keys in the key vault 310 are stored in either registers or a memory array such as SRAM. When a key is accessed from the key vault 310, the N data-bits for the retrieved key are stored in the N Razor flip-flops.

Data vault 320 includes a number (Y) of data elements 321-1 through 321-Y and a number (M) of Razor flip-flops 322-1 through 322-M. The data elements in the key vault 310 are stored in either registers (e.g., a platform configuration register or PCR) or a memory array such as SRAM. When a data element is accessed from the data vault 320, the M data-bits for the retrieved data element are stored in the M Razor flip-flops.

Cryptography function 350 includes a key path register 351, a data path register 353, and a cryptography core 355. The key path register 351 includes a number (S) of Razor flip-flops 352-1 through 352-S. The data path registers 353 includes a number (T) of Razor flip-flops 354-1 through 354-T. The output of the Razor flip-flops 312 from the key vault 310 are coupled to an input of the key path register 351, while the output of the Razor flip-fops 322 from the data vault 320 are coupled to an input to the data path register 353. The output of the Razor flip-flops 352 from the key path register 351 are coupled to a key input of the cryptography core 355, while the output of the Razor flip-flops 354 from the data path register 353 are coupled to a data input of the cryptography core 355. A key output of the cryptography core 355 is coupled to an input of the key vault 310, while a data output of the cryptography core 355 is coupled to an input of the data vault 320.

Razor flip-flops 312-1 through 312-N are positioned in the key vault 310 to ensure that: every retrieved private key that exits the key vault 310 is Razor flip-flop protected, and the retrieved private key successfully reaches the intended cryptography destination. A number (N) of additional Razor flip-flops 330-1 through 330-N may be optionally used as repeaters for implementations where the signal strength is insufficient to preserve signal integrity and timing along the path from the key vault 310 to the key path register 351.

Razor flip-flops 322-1 through 322-M are positioned in the data vault 320 to ensure that: every retrieved data element (e.g., public key or PCR slot) that exits the data vault 320 is Razor flip-flop protected, and the retrieved data element successfully reaches the intended cryptography destination. A number (M) of additional Razor flip-flops 340-1 through 340-M may be optionally used as repeaters for implementations where the signal strength is insufficient to preserve signal integrity and timing along the path from the data vault 320 to the data path register 353.

Razor flip-flops 352-1 through 352-S are positioned in the key path register 351 to ensure that calculations of the keys in the cryptography function 350, are Razor flip-flop protected. Razor flip-flops 354-1 through 354-T are positioned in the data path register 353 to ensure that calculations of the data in the cryptography function 350, are Razor flip-flop protected.

When an error is detected in any of the Razor flip-flops, then a fault has been detected that may have been caused by glitch type of attack. In this instance, the cryptography function will continue to the end of the calculations to ensure that the side-channel attack is mitigated. In other words, the number of instructions and operations calculated in the cryptography function 350, as well as the number of transactions with the key path register 351 and the data path register 353, will not change as a result of the detected error or fault, and thus the side channel attack will not yield a detectable difference in execution time. Although the incorrect execution is allowed to complete, the output of the cryptographic calculation goes to a dummy key vault and dummy data vault (or PCR slot) so that the output may be silently discarded as the key slot cannot be reused for crypto function.

The size of the keys 311 correspond to the value N, which designates the number of bits required for their storage and thus the number of required Razor flip-flops 312. Similarly, the size of the data elements 311 correspond to the value M, which designates the number of bits required for their storage and thus the number of required Razor flip-flops 322. In some examples, the size of the keys 311 from the key vault 310 and the size of the data elements 321 from the data vault 320 are matched. In this instance, the values of M and N are matched to one another such that M=N. However, in other examples the sizes of the keys 311 and the data elements 321 are different from one another such that M N, which may be required in a particular cryptography function.

The size of the key path register 351 corresponds to the value S, which designates the number of bits required for storage and thus the number of required Razor flip-flops 352. In some examples, the size of the keys 311 from the key vault 310 and the size of the are key path register 351 are matched such that S=N. However, in other examples the size of the keys 311 from the key vault 310 and the size of the are key path register 351 are different from one another such that that S N, which may be required in a particular cryptography function. For example, in some cryptography functions the keys may require padding to achieve a specific size.

The size of the data path register 351 corresponds to the value T, which designates the number of bits required for storage and thus the number of required Razor flip-flops 353. In some examples, the size of the data elements 321 from the data vault 320 and the size of the are data path register 353 are matched such that T=M. However, in other examples the size of the data elements 321 from the data vault 320 and the size of the are data path register 353 are different from one another such that that T M, which may be required in a particular cryptography function. For example, in some cryptography functions the data elements may require padding to achieve a specific size.

Figure 4:
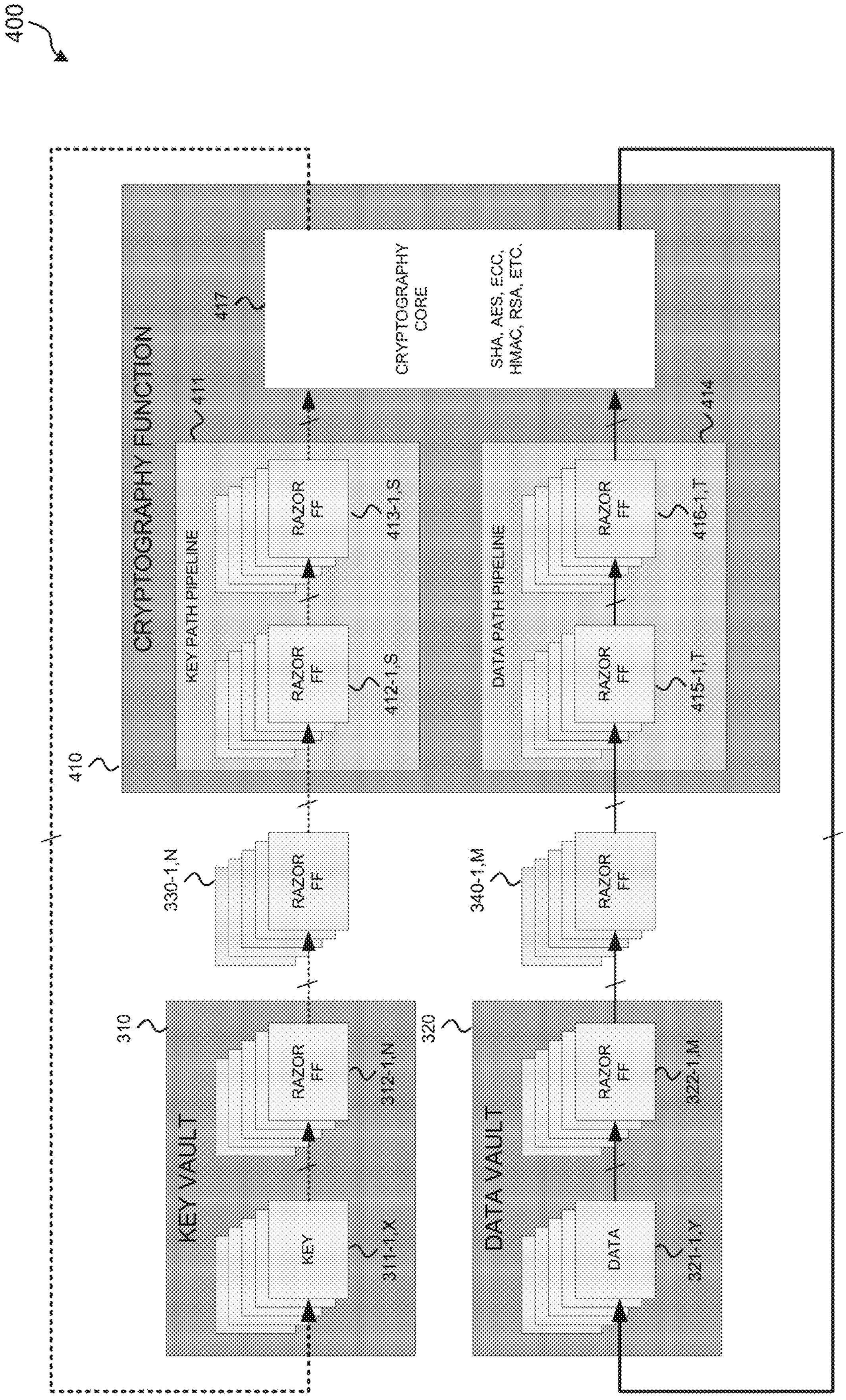
FIG. 4 shows an illustrative schematic of a second example device that is arranged in accordance with aspects of the present disclosure.

FIG. 4 shows an illustrative schematic of a second example device 400 that is arranged in accordance with aspects of the present disclosure. Device 400 includes a key vault 310, a data vault 320, and a cryptography function 410. Device 300 also includes optional Razor flip-flops 330-1, N; and 340-1, M.

Device 400 is substantially similar to Device 300, where the cryptography function from FIG. 3 is now replaced with a different function that requires a pipeline. Cryptography function 410 includes a key path pipeline 411, a data path pipeline 414, and a cryptography core 417. The key output of the cryptography core 417 is coupled to an input of the key vault 310, while a data output of the cryptography core 417 is coupled to an input of the data vault 320.

The key path pipeline 411 includes two sets of Razor flip-flops 412 and 413 that are arranged in a pipeline. The output of the Razor flip-flops 312 from the key vault 310 are coupled to an input of the key path pipeline 411, which corresponds to the input of the first set of Razor flip-flops 412-1 through 412-S. The output of the first set of Razor flip-flops 412-1 through 412-S from the key path pipeline 411 are coupled the input of a second set of Razor flip-flops 413-1 through 413-S in the key path pipeline 411. The output of the second set of Razor flip-flops 413-1 through 413-S in the key path pipeline 411 are coupled to the key input of the cryptography core 417. Similar to the example of FIG. 3, the number (N) of Razor flip-flops in the key vault 310 and in the number (S) of Razor flip-flops in the key path pipeline may be matched (S=N) or different from one another (S N) depending on the requirements for the cryptography function 410 and the corresponding cryptography core 417.

The data path pipeline 414 includes two sets of Razor flip-flops 415 and 416 that are arranged in a pipeline. The output of the Razor flip-flops 322 from the data vault 320 are coupled to an input of the data path pipeline 414, which corresponds to the input of the Razor flip-flops 415-1 through 415-T. The output of the first set of Razor flip-flops 415-1 through 415-T from the data path pipeline 414 are coupled to the input of the second set of Razor flip-flops 416-1 through 416-T in the data path pipeline 414. The output of the second set of Razor flip-flops 416-1 through 416-T in the data path pipeline 414 are coupled to the data input of the cryptography core 417. Similar to the example of FIG. 3, the number (M) of Razor flip-flops in the data vault 320 and in the number (T) of Razor flip-flops in the data path pipeline may be matched (T=M) or different from one another (T M) depending on the requirements for the cryptography function 410 and the corresponding cryptography core 417.

Razor flip-flops 312 are again positioned in the key vault 310 to ensure that: every retrieved private key that exits the key vault 310 is Razor flip-flop protected, and that the retrieved private key successfully reaches the intended cryptography destination. Additional Razor flip-flops 330 may again be optionally used as repeaters for implementations where the signal strength is insufficient to preserve signal integrity and timing along the path from the key vault 310 to the key path pipeline 411.

Razor flip-flops 322 are again positioned in the data vault 320 to ensure that: every retrieved data element (e.g., public key or PCR slot) that exits the data vault 320 is Razor flip-flop protected, and the retrieved data element successfully reaches the intended cryptography destination. Additional Razor flip-flops 340 may again be optionally used as repeaters for implementations where the signal strength is insufficient to preserve signal integrity and timing along the path from the data vault 320 to the data path pipeline 414.

The Razor flip-flops 412 and 413 are positioned in the key path pipeline 411 to ensure that calculations of the keys in the cryptography function 410 are Razor flip-flop protected. Razor flip-flops 415 and 416 are positioned in the data path pipeline 353 to ensure that calculations of the data in the cryptography function 410, are Razor flip-flop protected.

When an error is detected in any of the Razor flip-flops, then a fault has been detected that may have been caused by glitch type of attack. In this instance, the cryptography function will continue to the end of the calculation to ensure that the side-channel attack is mitigated. In other words, the number of instructions and operations calculated in the cryptography function 410, as well as the number of transactions with key path pipeline 411 and data path pipeline 414, will not change as a result of the detected error or fault, and thus the side channel attack will not yield a detectable difference in execution time. Although the incorrect execution is allowed to complete, the output of the cryptographic calculation goes to a dummy key vault and dummy data vault (or PCR slot) so that the output may be silently discarded as the key slot cannot be reused for crypto function.

Figure 5:
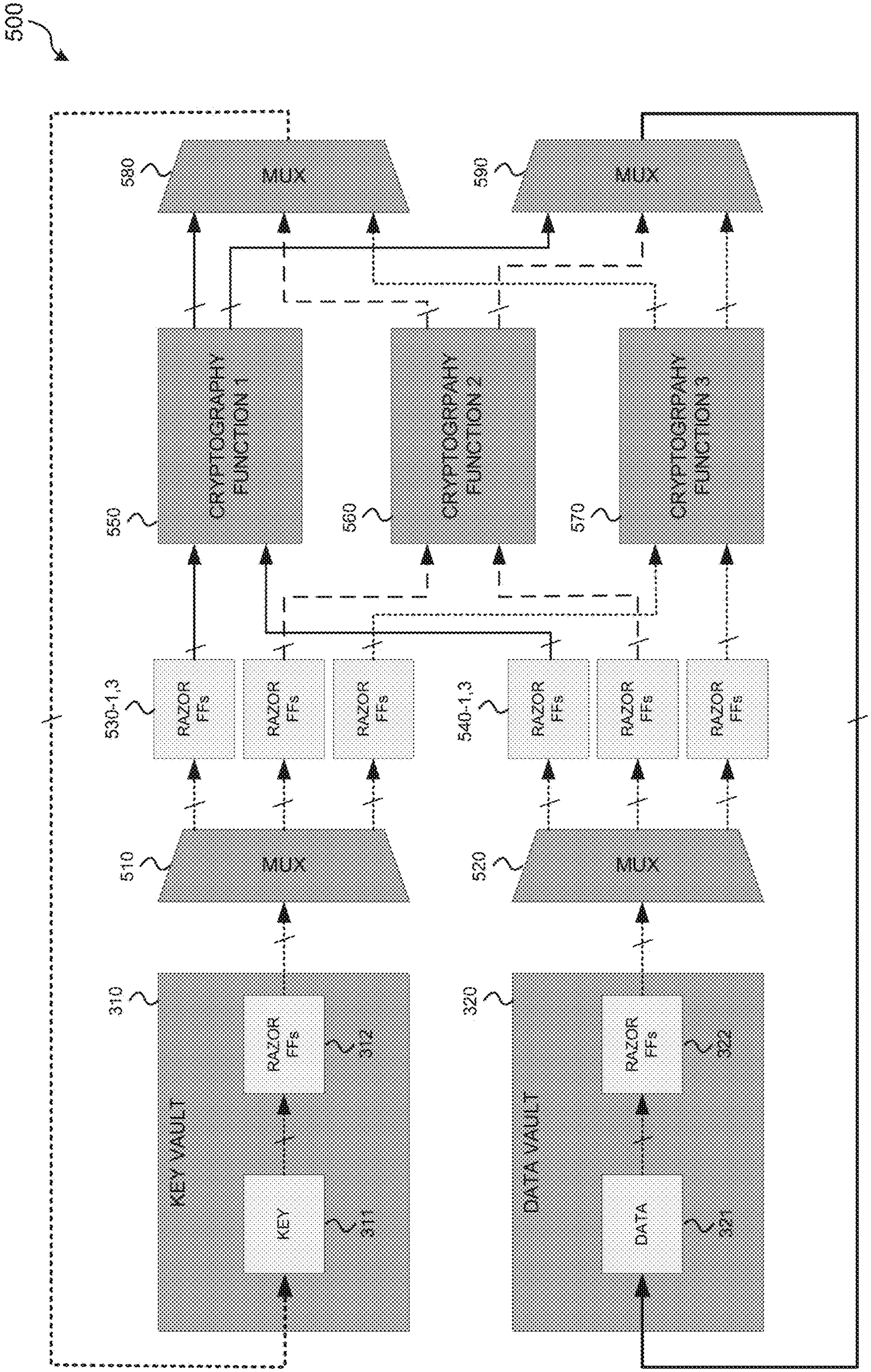
FIG. 5 shows an illustrative schematic of a third example device that is arranged in accordance with aspects of the present disclosure.

FIG. 5 shows an illustrative schematic of a third example device 500 that is arranged in accordance with aspects of the present disclosure. Device 500 includes a key vault 310, a data vault 320, three cryptography functions 550, 560 and 570, four multiplexers 510, 520, 580, and 590. Device 500 also includes a six sets of Razor flip-flops 530-1 through 530-3 and 540-1 through 540-3.

Device 500 is substantially similar to devices 300 and 400, but with the addition of multiplexers that are configured to selectively route of signals to enable selection of one of multiple cryptography functions. A first multiplexer 510 selectively (e.g., in response to a control signal, not shown) routes a path from the output of the key vault 310 to a key input of one of a first cryptography function 550, a second cryptography function 560, and a third cryptography function 570. A second multiplexer 520 selectively (e.g., in response to another control signal, not shown) routes a path from the output of the data vault 320 to a data input of one of the first cryptography function 550, the second cryptography function 560, and a third cryptography function 570. A third multiplexer 580 selectively (e.g., in response to still another control signal, not shown) routes a path from the key output of one of the first cryptography function 550, the second cryptography function 560, and the third cryptography function 570 to the key input of the key vault 310. A fourth multiplexer 580 selectively (e.g., in response to yet another control signal, not shown) routes a path from the data output of one of the first cryptography function 550, the second cryptography function 560, and the third cryptography function 570 to the data input of the data vault 320.

Razor flip-flops 530-1 through 530-3 are arrange as repeaters, each coupled between a respective output of the first multiplexer 510 and a respective key input of one of the first cryptography function 550, the second cryptography function 560, and the third cryptography function 570. Razor flip-flops 540-1 through 540-3 are arrange as repeaters, each coupled between a respective output of the second multiplexer 540 and a respective data input of one of the first cryptography function 550, the second cryptography function 560, and the third cryptography function 570. The repeaters are again used in implementations where the signal strength is insufficient to preserve signal integrity and timing along their respective paths.

In some instances, Razor flip-flops 530-1 through 530-3 may implemented as a single Razor flip-flop 530 with common outputs to all of the cryptographic functions. Razor flip-flops 540-1 through 540-3 may similarly implemented as a single Razor flip-flop 540 with common outputs to all of the cryptographic functions.

In some examples, multiplexers 510 and 520 may be eliminated so that all three cryptography functions may be operated in parallel. In this example, one or more of the Razor flip-flops 530 and 540 may be eliminated, depending on repeater requirements for the overall implementation. Additionally, these types of implementations may be beneficial in hiding the specific cryptography function selected by masking the overall physical characteristics of the device 500, and thus further impeding a side channel attack's chance of success. However, in these examples, a single set of outputs would still be selected to propagate back to the inputs of the key vault and the data vault.

Although the individual Razor flip-flops in FIG. 5 are illustrated as single blocks, it is understood that these Razor flip-flops are arranged similar to that described with respect to FIGS. 1-4, where each Razor flip-flop group or set has a number of bits matched to the key or data path requirements.

The illustrated implementation of FIG. 5 is not intended to be limiting. For example, any of the cryptography functions in FIG. 5 may include any combination of data path registers or data path pipelines, and key path registers or key path pipelines, as may be required for the selected cryptography function. Example cryptography functions may include, but are not limited to, Secure Hash Algorithms (SHA-1, SHA-2, SHA-3, etc.), Advanced Encryption Standard (AES), Elliptical Curve Cryptography (ECC), Hash-based Message Authentication Code (HMAC), and Rivest-Shamir-Adleman (RSA), to name a few.

Figure 6:
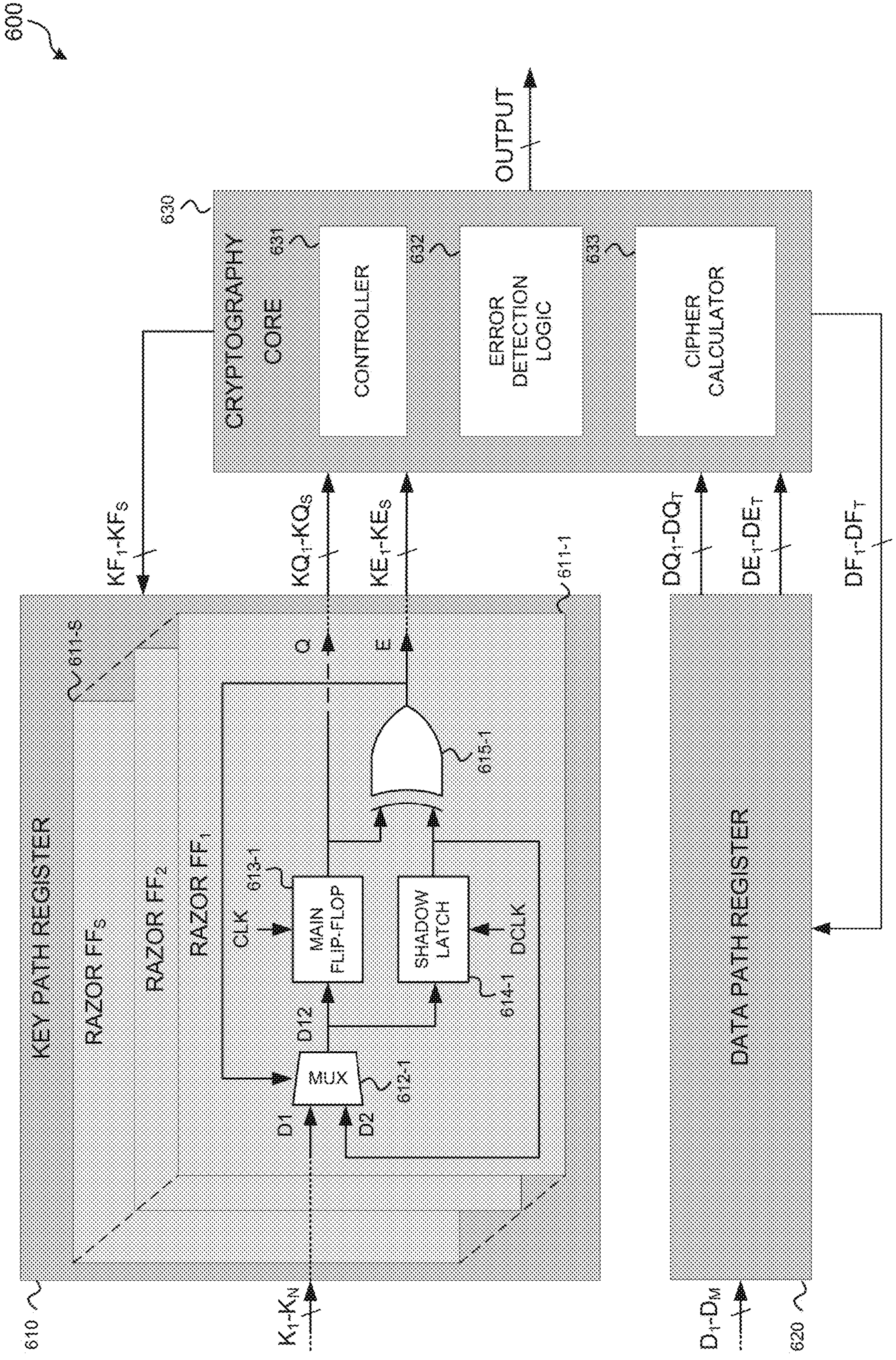
FIG. 6 shows an illustrative schematic of a fourth example device that is arranged in accordance with aspects of the present disclosure.

FIG. 6 shows an illustrative schematic of a fourth example device 600 that is arranged in accordance with aspects of the present disclosure. As shown, the example device 600 includes a key path register 610, a data path register 620 and a cryptography core 630. The example device 600 may correspond to a cryptography function such as described with respect to FIGS. 1-5, and thus may be again implemented as part of a SOC, ASIC, FPGA, CPU, GPU or other similar type of device.

The key path register 610 in FIG. 6 is illustrated as including a number (S) of Razor flip-flops 611-1 through 611-S. An input to the key path register 610 may correspond to an N-bit key from a key vault (not shown), as designated by $K_1$-$K_N$. An output of the key path register 610 is coupled to a key input of the cryptography core 630, which is designated by $KQ_1$-$KQ_S$ and $KE_1$-$KE_S$. The cryptography core has a feedback output that is coupled to the key path register, which may provide a revised or adjusted key as feedback that is stored in the key path register 610, as designated by $KF_1$-$KF_S$.

The data path register 620 in FIG. 6 includes a number (T) of Razor flip-flops (e.g., 621-1 through 621-T), which are similarly arranged to the key path register 610, but not shown to simplify the diagram. An input to the data path register 620 may correspond to an M-bit data element from a data vault (not shown), as designated by $D_1$-$D_N$. An output of the data path register 620 is coupled to a data input of the cryptography core 630, which is designated by $DQ_1$-$DQ_T$ and $DE_1$-$DE_T$. The cryptography core has a feedback output that is coupled to the data path register, which may provide a revised or adjusted data element as feedback that is stored in the data path register 620, as designated by $DF_1$-$DF_T$.

Similar to previous descriptions found herein, the number (S) of Razor flip-flops 611 in the key path register 610 and the number (T) of Razor flip-flops in the data path register 620 may both be determined by the size or bit width required by the cryptography function and the corresponding cryptography core 630. In some examples, the data elements and the keys have the same sizes such that M=N, while in other examples the data elements and the keys have different sizes such that M≠N. In still other examples, the keys and the key path register have the same sizes such that S=N, while in other examples the keys and the key path register have different sizes such that S≠N; such as where additional padding bits may be required to achieve a specific size. In still more examples, the data elements and the data path register have the same sizes such that T=M, while in other examples the data elements and the data path register have different sizes such that T≠M; such as where additional padding bits may be required to achieve a specific size.

Each of the Razor flip-flops includes digital circuits for a multiplexer, a main flip-flop, a shadow latch and a comparator. For example, Razor flip flop 611-1 includes multiplexer 612-1, main flip-flop 613-1, shadow latch 614-1, and comparator 615-1. An input of a Razor flip-flop is coupled to a first data input of the multiplexer (MUX), which is designate as D1. The output of the multiplexer is coupled to the inputs of both the main flip-flop and the shadow latch, which is designated as D12. The output of the main flip-flop is coupled to a first input of the comparator, which is designated as Q. The output of the shadow latch is coupled to a second input of the comparator, and also to a second data input of the multiplexer, which is designated as D2. The output of the comparator is coupled to the control input of the multiplexer, which is designated as E. The comparator is illustrated as an exclusive OR logic gate (XOR) in this example, but other arrangements are also possible. Additionally, the detailed implementation of one or more of the main flip-flop, the shadow latch, the multiplexer, and the comparator may be combined at the transistor circuit level so long as the overall functions are preserved.

Operationally, each Razor flip-flop is initially reset so that the main flip-flop and the shadow latch have matched logic output values (e.g., both either a logic 1 or a logic 0). In this instance, the comparator sees no difference and the error signal, E, indicates no error is present. Responsively, the multiplexer routes the first data input D1 to D12 as the inputs to the main flip-flop and the shadow latch. The main flip-flop is clocked by a first clock signal CLK, while the shadow latch is clocked by a second clock signal DCLK, where the second clock signal DCLK is slightly delayed in time with respect to the first clock signal. Assuming the setup and hold times of both the main flip-flop and the shadow latch are met in the next clock cycle, then the main flip-flop and the shadow latch continue to generate matched output values where Q=D2 and no error signal is indicated by E. However, due to power and timing variations that may be injected by an attack, the setup and hold times of the main flip-flop may not be met (e.g., sub-critical voltage scaling may change the threshold voltages and/or timing). In this instance, the setup and hold times of the shadow latch may still be met by virtue of the delayed clocking, and the resulting outputs of the shadow latch and the main flip-flop no longer match (Q≠D2) and an error is indicated by asserting E.

The input to each of the Razor flip-flops 611-1 through 611-S in the key path register 610 corresponds to a respective single bit from a key value to be stored. In some instances, the key value to be stored is from the key vault (e.g., $K_1$-$K_N$), while in other instances the key value to be stored may result from an output of the cryptography core (e.g., $KF_1$-$KF_S$), which may include padding or other encoded bits.

The input to each of the Razor flip-flops 621-1 through 612-T (not shown) in the data path register 620 corresponds to a respective single bit from a data value to be stored. In some instances, the data value to be stored is from the data vault (e.g., $D_1$-$D_M$), while in other instances the data value to be stored may result from an output of the cryptography core (e.g., $DF_1$-$DF_T$), which may include padding or other encoded bits.

The output of each of the Razor flip-flops 611-1 through 611-S in the key path register 610 corresponds to a respective single bit from a stored key value (e.g., $KQ_1$-$KQ_S$) and an associated error bit (e.g., $KE_1$-$KE_S$). The output of each of the Razor flip-flops 621-1 through 621-S in the data path register 620 corresponds to a respective single bit from a stored data value (e.g., $DQ_1$-$DQ_T$) and an associated error bit (e.g., $DE_1$-$DE_T$). The stored values (e.g., $KQ_1$-$KQ_S$ and $DQ_1$-$DQ_T$) and error associated error bits (e.g., $KE_1$-$KE_S$ and $DE_1$-$DE_T$) are processed by the cryptography core 630.

The cryptography core includes a controller 631, an error detection logic 632, and a cipher calculator 633. In various examples, the controller 631 may be configured to organize input and output data/vectors, add padding to input and output data/vectors, schedule and process communications/messages, initiate calculations, initiate encoding, and trap detected error conditions for the desired cryptography function. The error detection logic 632 in the cryptography core 630 senses the errors from one or more of the error bits (e.g., $KE_1$-$KE_S$ and $DE_1$-$DE_T$) and informs the controller 631 that the output of the cryptography function is to be encoded as invalid. Mathematical calculations and vector manipulations may be performed by the cipher calculator 633, which may be optimized to initiate operations such as bit rotation, bit shifting, addition, subtraction, multiplication, masking, bit inversion, logic operations such as AND or XOR, swapping of rows or columns, concatenation, etc.

Once the error detection logic 532 in the cryptography core senses an error, the cryptography function will continue to the end of the calculations to ensure that the side-channel attack is mitigated. In other words, the number of instructions and operations calculated in the cryptography function, as well as the number of transactions with the key path register 610 and the data path register 620, will not change as a result of the detected error or fault, and thus the side channel attack will not yield a detectable difference in execution time. Although the incorrect execution is allowed to complete, the output of the cryptographic calculation goes to a dummy key vault and dummy data vault (or PCR slot) so that the output may be silently discarded as the key slot cannot be reused for crypto function.

Figure 7:
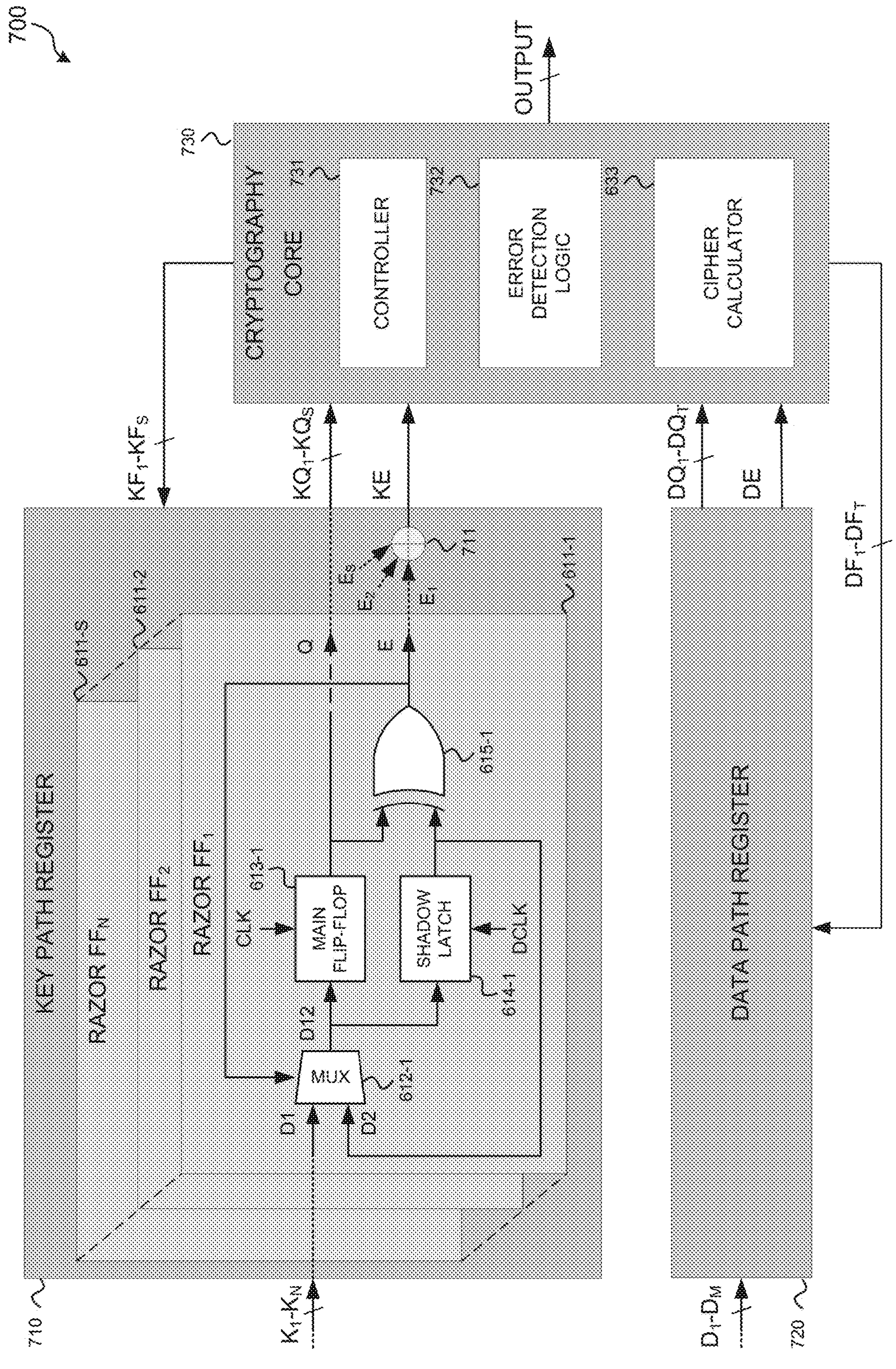
FIG. 7 shows an illustrative schematic of a fifth example device that is arranged in accordance with aspects of the present disclosure.

FIG. 7 shows an illustrative schematic of a fifth example device 700 that is arranged in accordance with aspects of the present disclosure. Device 700 includes a key path register 710, a data path register 720, and a cryptography core 730. The example device 700 may correspond to a cryptography function such as described with respect to FIGS. 1-6, and thus may be again implemented as part of a SOC, ASIC, FPGA, CPU, GPU or other similar type of device.

Device 700 is substantially similar to Device 600, where the key path register 710 and data path register 720 again include multiple Razor flip-flops 611-1 through 611-S, and 621-1 through 621-T (not shown), respectively. However, for device 700, the key path register 710 includes an additional logic circuit 711, which corresponds to a multi-input OR logic function. Logic circuit 711 combines all of the error signals from the Razor flip-flops 611-1 through 611-S into a single error signal output, KE, that indicates if any one of the Razor flip-flops in the key path register 710 has a fault. The single error signal KE is coupled to an error input of the cryptography core for error detection. The data path register 720 is arranged similar to the key path register 710, and thus also includes a single error signal output corresponding to DE, which is also provided to the cryptography core 730.

Additional wiring is eliminated from the examples of FIGS. 1-7 to improve readability and remove clutter. For example, in each instance where we have digital electronics such as for the Razor flip-flops and the cryptography functions, power and clock signals are required. Since the power inputs (e.g., VDD, VSS, GND) are implicitly required in all transistor based implementations, the wiring is eliminated from the drawings. Likewise, since clock inputs (e.g., CLK, DCLK) are required through all varieties of registers, flip-flops, and processors in digital electronics, the wiring is eliminated from the drawings.

The illustrated examples of FIG. 3 through FIG. 7 are not intended to be limiting. For example, although FIG. 3 illustrates a key path register 351 and a data path register 353, either or both of those registers may be replaced with a pipeline as may be required by the specific cryptography function employed. The same is true for the examples of FIG. 6 and FIG. 7, where one or more of the path registers may be replaced with pipeline implementations depending on the specific cryptography function employed. Additionally, although FIG. 4 illustrates the key path pipeline and the data path pipeline as having matched lengths of two, this is merely an example pipeline length and the specific length for each of the key and data pipelines may be varied based on the specific cryptography function employed.

The error signal processing described with respect to the examples of FIG. 6 and FIG. 7, can be equally applied to the examples of FIG. 3 through FIG. 5. For example, in FIGS. 3-5 the error output signals of the Razor flip-flops in the key vault 310 or the data vault 320 may either be provided directly to the cryptography core of the corresponding cryptography function (350, 410, 550, 560, 570) or be combined with the other error signals (e.g., a logical OR operation) that are provided to the cryptography core or the corresponding cryptography function (350, 410, 550, 560, 570).

In contrast to conventional schemes that attempt to mitigate attacks by termination of calculations once an attack is detected, the presently disclosed devices, systems and techniques continue the calculations after detection until the natural termination point is reached. By continuing the calculations until the natural termination point, side channel attacks are mitigated since the corresponding information leak is prevented. Additional benefits may include improved fault tolerance to glitching of power of timing in the corresponding system.

The present disclosure further contemplates that the presently disclosed devices, systems and techniques achieve fault tolerance without complex and costly analog circuitry schemes, and thus a reduced cost and reduced circuit area are achieved. Also, power consumption may be reduced by employing the disclosed digital techniques.

Although described with respect to power and timing types of glitch attacks, the described techniques are equally applicable to other types of attacks, including but not limited to thermal attacks and electromagnetic attacks, which may also cause changes in threshold voltages, timing, and setup and hold times that are detected by the Razor flip-flops described herein.

The disclosure presented herein also encompasses the subject matter set forth in the following clauses:

Example Clause A: A device to detect and mitigate a side-channel attack (SCA), the device comprising: a key vault with a first input port, a key output port, a first power port, and a first clock port; a data vault with a second input port, a data output port, a second power port, and a second clock port; a cryptography function with a key input port, a data input port, a cryptographic key output port, a cryptographic output port, a third power port, and a third clock port; a first Razor-flop-flop that is located within the key vault and positioned between the key output port and the key input port; a second Razor flip-flop that is located within the data vault and positioned between the data output port and the data input port; a third Razor flip-flop, that is located within a path of the cryptography function; and an error detection logic in the cryptography function that senses an error associated with the side channel-attack from any one of the first, second, and third Razor flip-flops, wherein the error detection logic indicates that an output of the cryptography function is to be encoded as invalid.

Example Clause B: The device of any of the example clauses, wherein the side channel attack corresponds to one or more of a thermal attack, an electromagnetic attack, a power attack, or a timing attack.

Example Clause C: The device of any of the example clauses, wherein each of the first, second and third Razor flip-flops further include a corresponding error output signal, wherein the error output signals each indicate a detected fault in corresponding one of the first, second and third Razor flip-flops.

Example Clause D: The device of any of the example clauses, wherein the error detection logic in the cryptography function is configured to evaluate each of the error output signals each of the first, second and third Razor flip-flops, wherein the error output signals each indicate a detected fault in corresponding one of the first, second and third Razor flip-flops.

Example Clause E: The device of any of the example clauses, further comprising a logic circuit that is configured to combine the error output signals of the first, second and third Razor flip-flops into a combined error signal, wherein the combined error signal indicates a detected fault in cany one of the first, second and third Razor flip-flops, and wherein the error detection logic in the cryptography function is configured to evaluate the combined error signal.

Example Clause F: The device of any of the example clauses, wherein the cryptography function is configured to continue to the natural end of calculations after the error is detected to ensure that the side-channel attack will not yield a detectable difference in execution time.

Example Clause G: The device of any of the example clauses, wherein the cryptography function is configured to generate a dummy output after the error is detected so that the output may be ignored or discarded.

Example Clause H: The device of any of the example clauses, wherein each of the first, second, and third Razor flip-flops includes a multiplexer, a main flip-flop, a shadow latch, and a comparator, wherein: a first data input of the multiplexer (MUX) corresponds to an input of the corresponding Razor flip-flop; an output of the multiplexer is coupled to the inputs of both the main flip-flop and the shadow latch; an output of the main flip-flop, which corresponds to an output of the corresponding Razor flip-flop, is coupled to a first input of the comparator; an output of the shadow latch is coupled to a second input of the comparator and also to a second data input of the multiplexer; and an output of the comparator, which corresponds to an error output signal, is coupled to the control input of the multiplexer.

Example Clause I: The device of any of the example clauses, wherein the cryptography function corresponds to one of a Secure Hash Algorithms (SHA-1, SHA-2, SHA-3, etc.), an Advanced Encryption Standard (AES), an Elliptical Curve Cryptography (ECC), a Hash-based Message Authentication Code (HMAC), and a Rivest-Shamir-Adleman (RSA) cryptography function.

Example Clause J: A device to detect and mitigate a side-channel attack (SCA), the device comprising: a key vault with a first input port and key output port, wherein the key vault is configured to store and retrieve security keys; a data vault with a second input port and a data output port, wherein the data vault is configured to store and retrieve data elements; a cryptography function with a key input port that is coupled to the key output port of the key vault, a data input port that is coupled to the data output port of the data vault, and a cryptographic key output port, wherein the cryptography function includes a cryptography core; a first Razor-flop-flop that is located within the key vault and configured to store a first key, wherein the first Razor flip-flop provides the first key and a first key error signal to the key output port; a second Razor flip-flop that is located within the data vault and configured to store a first data element, wherein the second Razor flip-flop provides the first data element and a first data error signal to the data output port; a third Razor flip-flop that is located within a key path of the first cryptography function between the first key input port and the cryptography core to provide a second key and a second key error signal to the cryptography core; a fourth Razor flip-flop, that is located within a data path of the cryptography function between the data input port and the cryptography core to provide a second data element and a second data error signal to the cryptography core; and an error detection logic in the cryptography core that senses an error associated with the side channel-attack from any one of the first, second, third, and fourth Razor flip-flops, wherein the error detection logic indicates that an output of the cryptography function is to be encoded as invalid.

Example Clause K: The device of any of the example clauses, wherein the key path corresponds to one of a key path register and a key path pipeline.

Example Clause L: The device of any of the example clauses, wherein the data path corresponds to one of a data path register and a data path pipeline.

Example Clause M: The device of any of the example clauses, further comprising a first repeater Razor flip-flop that is positioned between the key vault and the cryptography function, and a second repeater Razor flip-flop that is positioned between the data vault and the cryptography function.

Example Clause N: The device of any of the example clauses, wherein the cryptography function is configured to continue to the natural end of calculations after the error is detected to ensure that the side-channel attack will not yield a detectable difference in execution time.

Example Clause O: The device of any of the example clauses, wherein the cryptography function is configured to generate a dummy output after the error is detected so that the output may be ignored or discarded.

Example Clause P: The device of any of the example clauses, wherein each of the first, second, third, and fourth Razor flip-flops includes a multiplexer, a main flip-flop, a shadow latch, and a comparator, wherein: a first data input of the multiplexer (MUX) corresponds to an input of the corresponding Razor flip-flop; an output of the multiplexer is coupled to the inputs of both the main flip-flop and the shadow latch; an output of the main flip-flop, which corresponds to an output of the corresponding Razor flip-flop, is coupled to a first input of the comparator; an output of the shadow latch is coupled to a second input of the comparator and also to a second data input of the multiplexer; and an output of the comparator, which corresponds to an error output signal, is coupled to the control input of the multiplexer.

Example Clause Q: The device of any of the example clauses, wherein the cryptography function corresponds to one of a Secure Hash Algorithms (SHA-1, SHA-2, SHA-3, etc.), an Advanced Encryption Standard (AES), an Elliptical Curve Cryptography (ECC), a Hash-based Message Authentication Code (HMAC), and a Rivest-Shamir-Adleman (RSA) cryptography function.

Example Clause R: The device of any of the example clauses, The device of any of the example clauses, further comprising: a second cryptography function with a second key input port that is coupled to key output port of the key vault, a second data input port that is coupled to the data output port of the data vault, a second cryptographic key output port, wherein the second cryptography function includes a second cryptography core; a fifth Razor flip-flop that is located within a key path of the second cryptography function between the second key input port and the second cryptography core to provide a third key and a third key error signal to the second cryptography core; a sixth Razor flip-flop that is located within a data path of the second cryptography function between the first data input port and the second cryptography core to provide a third data element and a third data error signal to second first cryptography core; and a second error detection logic in the second cryptography core of the second cryptography function that senses an error associated with the side channel-attack from any one of the first, second, fifth and sixth Razor flip-flops, wherein the second error detection logic indicates that an output of the second cryptography function is to be encoded as invalid.

Example Clause S: A device to detect and mitigate a side-channel attack (SCA), the device comprising: a key vault with a first input port and key output port, wherein the key vault is configured to store and retrieve security keys; a data vault with a second input port and a data output port, wherein the data vault is configured to store and retrieve data elements; a first cryptography function with a first key input port, a first data input port, and a cryptographic key output port, wherein the cryptography function includes a first cryptography core; a second cryptography function with a second key input port, a second data input port, a second cryptographic key output port, wherein the second cryptography function includes a second cryptography core; a first Razor-flop-flop that is located within the key vault and configured to store a first key, wherein the first Razor flip-flop provides the first key and a first key error signal to the key output port; a second Razor flip-flop that is located within the data vault and configured to store a first data element, wherein the second Razor flip-flop provides the first data element and a first data error signal to the data output port; a first multiplexer that selectively routes the key output port of key vault to either the first key input port of the first cryptography function or the second key input port of the second cryptography function; a second multiplexer that selectively routes the data output port of the data vault to either the first data input port of the first cryptography function or the second data input port of the second cryptography function; a third Razor flip-flop that is located within a key path of the first cryptography function between the first key input port and the first cryptography core to provide a second key and a second key error signal to the first cryptography core; a fourth Razor flip-flop, that is located within a data path of the first cryptography function between the first data input port and the first cryptography core to provide a second data element and a second data error signal to the first cryptography core; a fifth Razor flip-flop that is located within a key path of the second cryptography function between the second key input port and the second cryptography core to provide a third key and a third key error signal to the second cryptography core; a sixth Razor flip-flop that is located within a data path of the second cryptography function between the first data input port and the second cryptography core to provide a third data element and a third data error signal to second first cryptography core; a first error detection logic in the first cryptography core of the first cryptography function that senses an error associated with the side channel-attack from any one of the first, second, third, and fourth Razor flip-flops, wherein the error detection logic indicates that an output of the cryptography function is to be encoded as invalid; and a second error detection logic in the second cryptography core of the second cryptography function that senses an error associated with the side channel-attack from any one of the first, second, fifth and sixth Razor flip-flops, wherein the second error detection logic indicates that an output of the second cryptography function is to be encoded as invalid.

Example Clause T: The device of any of the example clauses, further comprising: a third multiplexer that selectively routes either the first cryptographic key output port or the second cryptographic key output port to the first input port of the key vault; and a fourth multiplexer that selectively routes either the first cryptographic key output port or the second cryptographic key output port to the second input port of the key vault.

It will be understood that the configurations and/or approaches described herein are exemplary in nature, and that these specific embodiments or examples are not to be considered in a limiting sense, because numerous variations are possible. The specific circuits, devices and systems described herein may represent one or more of any number of strategies. As such, various system and/or circuit components may be broken into additional functions or circuits, and/or combined with other functions or circuits as may be desirable in a specific implementation The subject matter of the present disclosure includes all novel and non-obvious combinations and sub-combinations of the various processes, circuits, devices, systems and configurations, and other features, functions and/or properties disclosed herein, as well as any and all equivalents thereof.

We claim:

1. A device to detect and mitigate a side-channel attack (SCA), the device comprising:

a key vault with a first input port, a key output port, a first power port, and a first clock port;

a data vault with a second input port, a data output port, a second power port, and a second clock port;

a cryptography function with a key input port, a data input port, a cryptographic key output port, a cryptographic output port, a third power port, and a third clock port, wherein the cryptography function is configured to calculate instructions and operations;

Razor flip-flops, comprising:

a first Razor flip-flop that is located within the key vault and positioned between the key output port and the key input port;

a second Razor flip-flop that is located within the data vault and positioned between the data output port and the data input port; and a third Razor flip-flop that is located within a path of the cryptography function, wherein the Razor flip-flops are configured to detect, by any one of the first Razor flip-flop, second Razor flip-flop, and third Razor flip-flop, an error associated with the side-channel attack; and an error detection logic in the cryptography function, wherein the error detection logic is configured to:

sense the error associated with the side-channel attack detected by any one of the first Razor flip-flop, second Razor flip-flop, and third Razor flip-flop; and determine that an output of the cryptography function is invalid by use of the error associated with the side-channel attack, wherein the cryptography function is configured to, in response to the determination that the output of the cryptography function is invalid:

continue the cryptography function without changing a number of the instructions and operations calculated in the cryptography function;

generate a dummy output, wherein the dummy output comprises invalid key data; and write the invalid key data to a key slot that cannot be reused for the cryptography function.

2. The device of claim 1, wherein the side-channel attack corresponds to one or more of a thermal attack, an electromagnetic attack, a power attack, or a timing attack.

3. The device of claim 1, wherein each of the first, second and third Razor flip-flops further includes a corresponding error output signal, wherein the error output signals each indicate a detected fault in corresponding one of the first, second and third Razor flip-flops.

4. The device of claim 1, wherein each of the first, second, and third Razor flip-flops includes a multiplexer, a main flip-flop, a shadow latch, and a comparator, wherein:

a first data input of the multiplexer (MUX) corresponds to an input of the corresponding Razor flip-flop;

an output of the multiplexer is coupled to the inputs of both the main flip-flop and the shadow latch;

an output of the main flip-flop, which corresponds to an output of the corresponding Razor flip-flop, is coupled to a first input of the comparator;

an output of the shadow latch is coupled to a second input of the comparator and also to a second data input of the multiplexer; and an output of the comparator, which corresponds to an error output signal, is coupled to a control input of the multiplexer.

5. The device of claim 3, wherein the error detection logic in the cryptography function is configured to evaluate each of the error output signals each of the first, second and third Razor flip-flops.

6. The device of claim 3, further comprising a logic circuit that is configured to combine the error output signals of the first, second and third Razor flip-flops into a combined error signal, wherein the combined error signal indicates a detected fault in any one of the first, second and third Razor flip-flops, and wherein the error detection logic in the cryptography function is configured to evaluate the combined error signal.

7. A device to detect and mitigate a side-channel attack (SCA), the device comprising:

a key vault with a first input port and a key output port, wherein the key vault is configured to store and retrieve security keys;

a data vault with a second input port and a data output port, wherein the data vault is configured to store and retrieve data elements;

a cryptography function with a key input port that is coupled to the key output port of the key vault, a data input port that is coupled to the data output port of the data vault, and a cryptographic key output port, wherein the cryptography function includes a cryptography core, and wherein the cryptography function is configured to calculate instructions and operations;

Razor flip-flops, comprising:

a first Razor flip-flop that is located within the key vault and configured to store a first key, wherein the first Razor flip-flop provides the first key and a first key error signal to the key output port;

a second Razor flip-flop that is located within the data vault and configured to store a first data element, wherein the second Razor flip-flop provides the first data element and a first data error signal to the data output port;

a third Razor flip-flop that is located within a key path of the cryptography function between the key input port and the cryptography core to provide a second key and a second key error signal to the cryptography core; and a fourth Razor flip-flop that is located within a data path of the cryptography function between the data input port and the cryptography core to provide a second data element and a second data error signal to the cryptography core, wherein the Razor flip-flops are configured to detect, by any one of the first, second, third, and fourth Razor flip-flops, an error associated with the side-channel attack; and an error detection logic in the cryptography function, wherein the error detection logic is configured to:

sense the error associated with the side-channel attack detected by any one of the first, second, third, and fourth Razor flip-flops; and determine that an output of the cryptography function is invalid by use of the error associated with the side-channel attack, wherein the cryptography function is configured to, in response to the determination that the output of the cryptography function is invalid:

continue the cryptography function without changing a number of the instructions and operations calculated in the cryptography function;

generate a dummy output, wherein the dummy output comprises invalid key data; and write the invalid key data to a key slot that cannot be reused for the cryptography function.

8. The device of claim 7, wherein the key path corresponds to one of a key path register and a key path pipeline.

9. The device of claim 7, wherein the data path corresponds to one of a data path register and a data path pipeline.

10. The device of claim 7, further comprising a first repeater Razor flip-flop that is positioned between the key vault and the cryptography function, and a second repeater Razor flip-flop that is positioned between the data vault and the cryptography function.

11. The device of claim 7, wherein each of the first, second, third, and fourth Razor flip-flops includes a multiplexer, a main flip-flop, a shadow latch, and a comparator, wherein:

a first data input of the multiplexer (MUX) corresponds to an input of the corresponding Razor flip-flop;

an output of the multiplexer is coupled to the inputs of both the main flip-flop and the shadow latch;

an output of the main flip-flop, which corresponds to an output of the corresponding Razor flip-flop, is coupled to a first input of the comparator;

an output of the shadow latch is coupled to a second input of the comparator and also to a second data input of the multiplexer; and an output of the comparator, which corresponds to an error output signal, is coupled to a control input of the multiplexer.

12. The device of claim 7, further comprising:

a second cryptography function with a second key input port that is coupled to the key output port of the key vault, a second data input port that is coupled to the data output port of the data vault, a second cryptographic key output port, wherein the second cryptography function includes a second cryptography core;

a fifth Razor flip-flop that is located within a key path of the second cryptography function between the second key input port and the second cryptography core to provide a third key and a third key error signal to the second cryptography core;

a sixth Razor flip-flop that is located within a data path of the second cryptography function between the second data input port and the second cryptography core to provide a third data element and a third data error signal to the second cryptography core; and a second error detection logic in the second cryptography core of the second cryptography function that senses an error associated with the side-channel attack from any one of the first, second, fifth and sixth Razor flip-flops, wherein the second error detection logic indicates that an output of the second cryptography function is to be encoded as invalid.

13. A device to detect and mitigate a side-channel attack (SCA), the device comprising:

a key vault with a first input port and a key output port, wherein the key vault is configured to store and retrieve security keys;

a data vault with a second input port and a data output port, wherein the data vault is configured to store and retrieve data elements;

a first cryptography function with a first key input port, a first data input port, and a cryptographic key output port, wherein the first cryptography function includes a first cryptography core, wherein the first cryptography function is configured to calculate instructions and operations;

a second cryptography function with a second key input port, a second data input port, a second cryptographic key output port, wherein the second cryptography function includes a second cryptography core;

Razor flip-flops, comprising:

a first Razor flop-flop that is located within the key vault and configured to store a first key, wherein the first Razor flip-flop provides the first key and a first key error signal to the key output port;

a second Razor flip-flop that is located within the data vault and configured to store a first data element, wherein the second Razor flip-flop provides the first data element and a first data error signal to the data output port;

a third Razor flip-flop that is located within a key path of the first cryptography function between the first key input port and the first cryptography core to provide a second key and a second key error signal to the first cryptography core;

a fourth Razor flip-flop that is located within a data path of the first cryptography function between the first data input port and the first cryptography core to provide a second data element and a second data error signal to the first cryptography core, wherein the Razor flip-flops are configured to detect, by any one of the first, second, third, and fourth Razor flip-flops, a first error associated with the side-channel attack;

a fifth Razor flip-flop that is located within a key path of the second cryptography function between the second key input port and the second cryptography core to provide a third key and a third key error signal to the second cryptography core; and a sixth Razor flip-flop that is located within a data path of the second cryptography function between the second data input port and the second cryptography core to provide a third data element and a third data error signal to the second first cryptography core, wherein the Razor flip-flops are further configured to detect, by any one of the first, second, fifth, and sixth Razor flip-flops, a second error associated with the side-channel attack;

a first multiplexer that selectively routes the key output port of the key vault to either the first key input port of the first cryptography function or the second key input port of the second cryptography function;

a second multiplexer that selectively routes the data output port of the data vault to either the first data input port of the first cryptography function or the second data input port of the second cryptography function;

a first error detection logic in the first cryptography core of the first cryptography function, wherein the first error detection logic is configured to: sense the first error associated with the side-channel attack detected by any one of the first, second, third, and fourth Razor flip-flops; and determine that an output of the first cryptography function is invalid by use of the first error associated with the side-channel attack; and a second error detection logic in the second cryptography core of the second cryptography function, wherein the second error detection logic is configured to: sense the second error associated with the side-channel attack detected by any one of the first, second, fifth and sixth Razor flip-flops, and determine that an output of the second cryptography function is invalid by use of the second error associated with the side-channel attack, wherein the first cryptography function is configured to, in response to the determination that the output of the first cryptography function is invalid:

continue the first cryptography function without changing a number of the instructions and operations calculated in the first cryptography function;

generate a dummy output, wherein the dummy output comprises invalid key data; and write the invalid key data to a key slot that cannot be reused for the first cryptography function.

14. The device of claim 13, further comprising:

a third multiplexer that selectively routes either the cryptographic key output port or the second cryptographic key output port to the first input port of the key vault; and a fourth multiplexer that selectively routes either a cryptographic output port of the first cryptography function or a cryptographic output port of the second cryptography function to the second input port of the data vault.

* * * * *